Feb. 11, 1936.  F. T. RADLEY  2,030,268
SELF WATERING SEED PAN
Filed Sept. 27, 1934
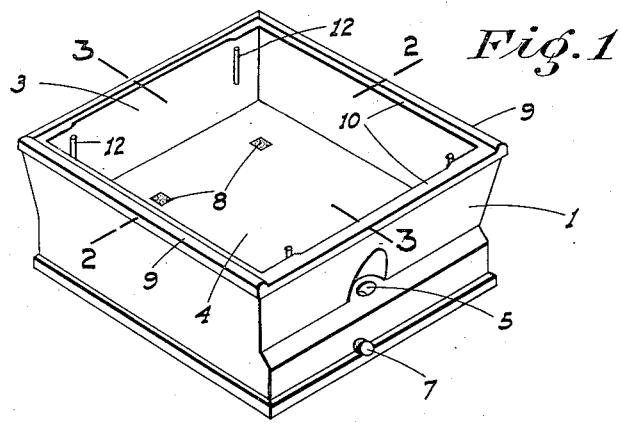
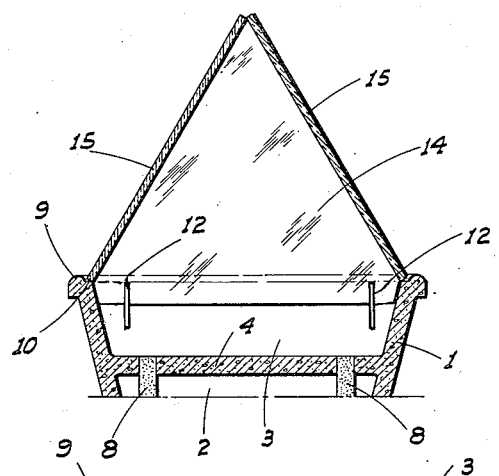
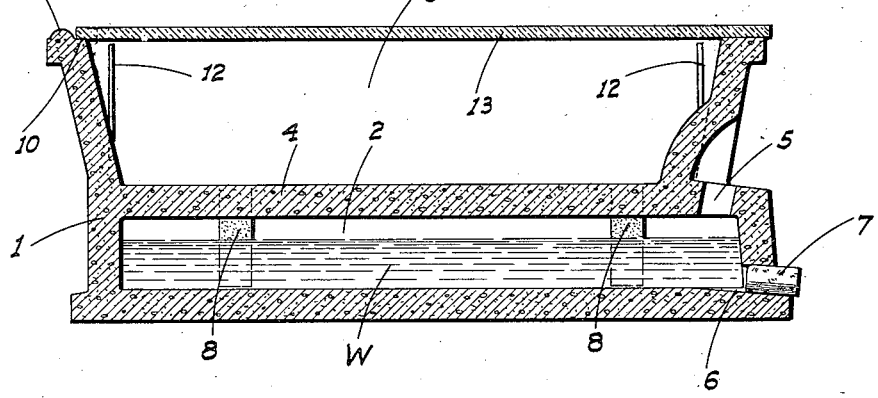
INVENTOR
*Fred T. Radley*
BY
ATTORNEY Patented Feb. 11, 1936

2,030,268

UNITED STATES PATENT OFFICE 2,030,268

SELF-WATERING SEED PAN

Fred T. Radley, Ceres, Calif.

Application September 27, 1934, Serial No. 745,747

3 Claims. (Cl. 47—38)

This invention relates to seed germinating pans and is directed particularly to a self-watering seed germinating pan.

The principal object of my invention is to provide a seed pan in which the soil may be automatically provided with sufficient moisture for the seeds over a relatively long period of time with only a single filling of the water supply reservoir.

It is also my purpose to provide a self watering seed pan in which the seeds will not be disturbed during germination as is often the case when an ordinary watering can or hose is employed. My self watering seed pan also prevents souring of the soil and unnecessary creation of fungus or algæ growth such as often occurs when the seed pan or box is set directly in a pan of water.

A further object of my invention is to provide a seed pan which is adapted to support a flat glass plate horizontally above the soil during the initial seed germination and then to support a miniature greenhouse over the soil during the period in which the plants begin to mature.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of my self watering seed pan.

Figure 2 is a fragmentary sectional elevation taken on line 2—2 of Figure 1, illustrating the small glass greenhouse as mounted on the seed pan.

Figure 3 is an enlarged sectional elevation taken on line 3—3 of Figure 1 and illustrating the flat glass plate in position.

Referring now more particularly to the characters of reference on the drawing, the numeral 1 denotes the substantially rectangular body of the seed pan which is separated horizontally into a lower enclosed water reservoir 2 and an upper seed pan 3 by a horizontal floor 4. This body structure may be cast integral from cement or other plastic material or may be formed from sheet metal such as galvanized iron, but in any event forms a single portable unit.

A water supply orifice 5 is formed in the body 1 exteriorly thereof to communicate with the top of reservoir 2 so that water may readily be supplied to the reservoir. The reservoir 2 is also provided with an outlet orifice 6 at one end and at the bottom level, normally closed by means of a plug 7 which is removed only when it is desired to drain the reservoir.

Extending down from the upper surface of and through the floor 4 are a plurality of symmetrically spaced capillary columns 8. These capillary columns are preferably formed of porous stone and extend down from the floor 4 to a termination adjacent the bottom of the reservoir 2 in order that the columns may draw up the water W as long as any remains in the reservoir.

Upstanding from the upper flat edges of the body on three sides thereof is a retaining bead 9 leaving a flat ledge 10 inwardly thereof for the purpose hereinafter described.

Projecting at an upwardly acute angle from each end wall of the pan on the inside of the same and above the bottom are spaced pins 12.

Adapted to rest on the ledge 10 and to be located in place by the bead 10 is a flat glass plate 13 (as in Figure 3) which is employed when the seeds are first planted in the seed pan, and adapted to be slid into or out of position from the beadless end of the pan. After the seeds germinate and grow into plants, the flat glass plate is removed and glass gables 14 are mounted in upright position between the pins 12 and the adjacent faces of the end walls of the pan.

Rectangular glass roof panes 15 are then placed in oppositely sloping relation against the edges of the gables and rest along their lower edge on the ledge 10 and against the beads 9 to form a small individual greenhouse for the seed pan as shown in Figure 2.

In use the seed pan is filled with soil to a level such as to leave the pins 12 exposed, and the seeds planted and the flat glass placed on the ledge 10 and over the soil. Water is then placed into the reservoir 2 through the supply orifice 5. The water is at once taken up by the capillary columns 8 and fed up to the soil in the seed pan. This self watering seed pan need only have the reservoir filled once in six or eight days and needs no other attention because the capillary columns continuously feed the necessary moisture to the soil in which the seeds are germinating. The water will be fed up to the soil as long as any remains in the reservoir because the capillary columns extend down to the bottom of the reservoir.

This device for watering the seeds greatly increases the proportion of seeds successfully germinated from 25% to 50% due to the fact that it materially lessens "damping off" which occurs when the watering is done from above and the water contacts the top of the young seedlings.

If desired, a concentrated fertilizer may be dissolved in the water placed in the reservoir thereby providing additional nourishment for the seedlings.

After the seedings begin to mature, the flat glass is removed and the gables and roof portions set up, as heretofore described, to provide for the small individual greenhouse for the seed pan.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A self watering seed pan comprising a body structure having an open seed pan, an enclosed reservoir below the seed pan, means to feed moisture from the reservoir to the seed pan, glass panes forming a greenhouse removably mounted on the body above the seed pan; said greenhouse comprising end gables and roof panes resting against the side edges of the gables, and means supporting the lower edges of the gables and panes adjacent the top edges of the body structure.

2. A self watering seed pan comprising as a unitary structure a seed pan, a water reservoir below the seed pan, and capillary columns extending from the seed pan to the reservoir; the upper edges of the body structure being flat and formed about three sides with an upstanding bead whereby a flat ledge is left inwardly thereof and upon which a flat glass plate may be slid into supporting position on the ledge from the open side of the same and held in place by the beads.

3. In a rectangular self watering seed pan flat about its upper edge, beads upstanding from said edge along two opposite sides of the pan to provide pane supporting ledges inwardly of said beads, upstanding pins projecting at an acute angle from the inside faces of the ends of the pan above the bottom of the pan but below said first named ledges, triangular glass panes removably secured in upstanding relation between the pins and the adjacent face of the pan, and rectangular glass planes supported on the first named ledges and resting against the edges of the triangular pane.

FRED T. RADLEY.